April 19, 1960
G. H. KOCH
2,933,273
PIVOTAL SUPPORT FOR FANS
Filed April 12, 1954
2 Sheets-Sheet 1
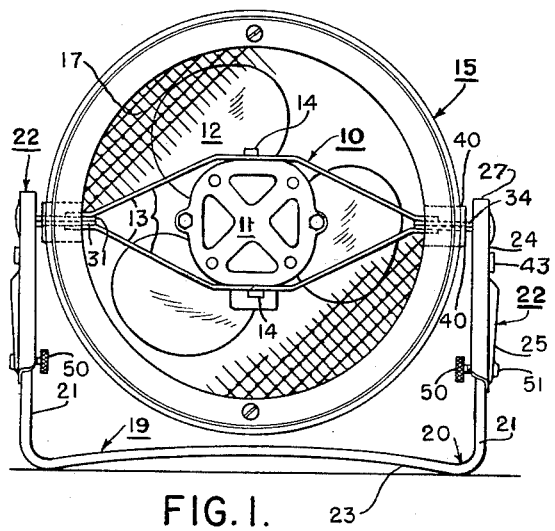
FIG. 1.
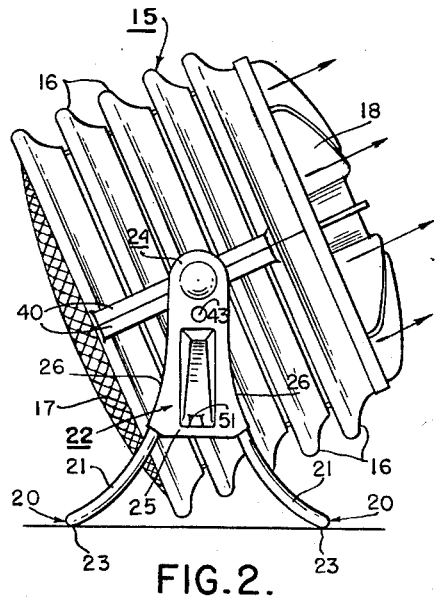
FIG. 2.
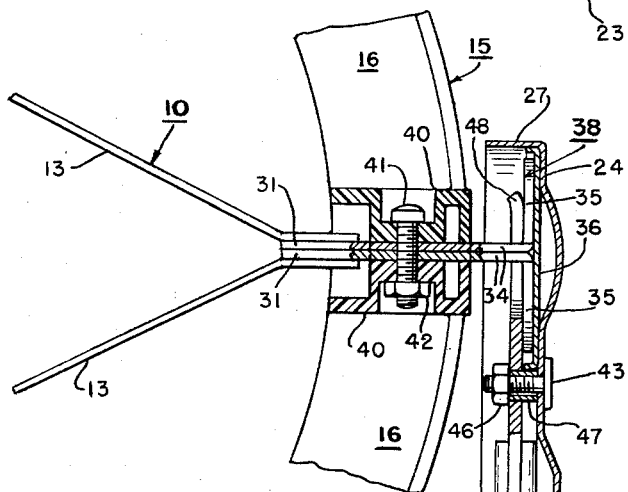
FIG. 3.
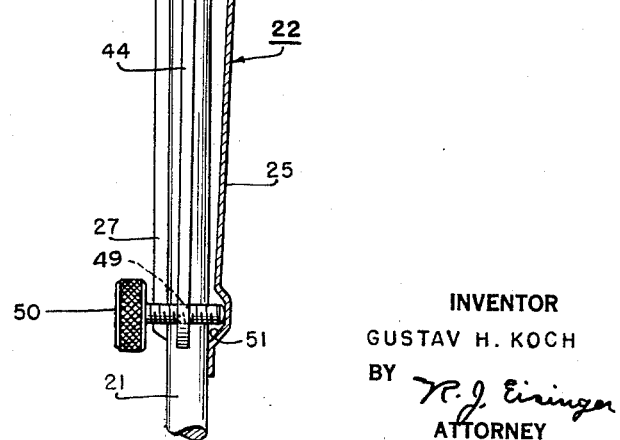
INVENTOR
GUSTAV H. KOCH
BY *(signature)*
ATTORNEY April 19, 1960
G. H. KOCH
2,933,273
PIVOTAL SUPPORT FOR FANS
Filed April 12, 1954
2 Sheets-Sheet 2
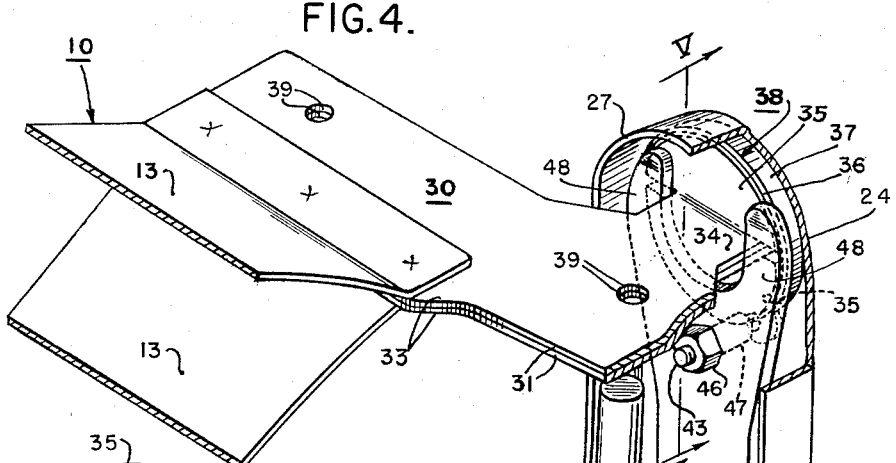
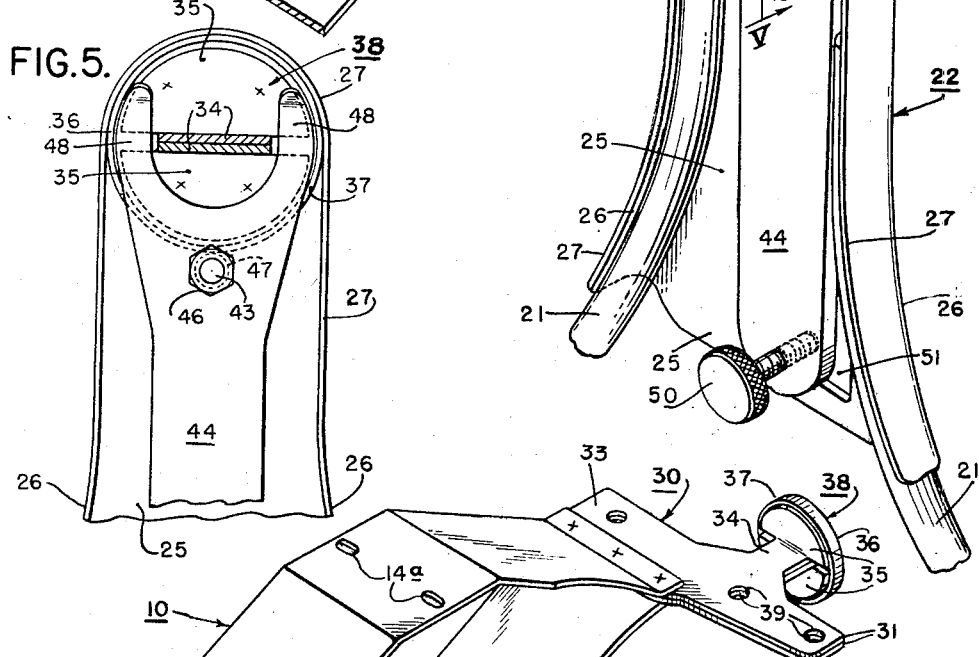
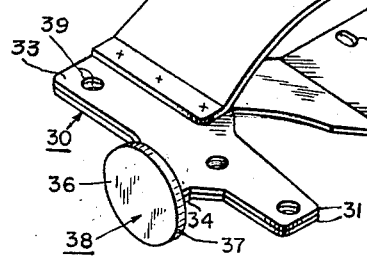
INVENTOR
GUSTAV H. KOCH
BY *R. J. Eisinger*
ATTORNEY United States Patent Office 2,933,273
Patented Apr. 19, 1960

2,933,273

PIVOTAL SUPPORT FOR FANS

Gustav H. Koch, Springfield, Mass., assignor to Westinghouse Electric Corporation, East Pittsburgh, Pa., a corporation of Pennsylvania Application April 12, 1954, Serial No. 422,299

2 Claims. (Cl. 248—13)

This invention relates to electric fans, and in particular to a fan trunnion and clamping arrangement pivotally connecting a fan with its support, whereby the fan may be tilted about a horizontal axis.

It is an object of this invention to provide a friction-type pivotal connection between the fan and its support which develops a constant frictional resistance to maintain the fan in any selected angular position.

A further object is to provide such a pivotal connection which is adjustable so as to provide a desired value of frictional resistance which is sufficient to hold the fan in any given angular position and yet to permit the fan to be repositioned by hand without changing the clamping pressure at the pivot.

The structure for accomplishing this includes a motor cradle having trunnion extensions and a support having bearing members which receive the trunnion extensions of said motor cradle, and adjustable lever clamping means coacting with said bearing members and said trunnion extensions. The adjustable lever clamping means preferably comprises a lever extending along the support, connected thereto or abutting the same at two points spaced from each other and from the pivot axis and including a portion engaging the trunnion extension on the side opposite the bearing member, the trunnion extension being thereby clamped between the bearing member and the lever.

Further objects and advantages of this invention will be apparent from the description which follows, when considered in connection with the accompanying drawings, in which like numerals indicate like parts wherever shown and wherein:

Fig. 1 is a rear elevational view of a fan embodying the improvements of the present invention;

Fig. 2 is a side view of the fan shown in Fig. 1, but showing the fan tilted to elevate the stream of air from the fan;

Fig. 3 is a sectional view, on a larger scale, taken through the trunnion and clamping arrangement of the fan shown in Fig. 2;

Fig. 4 is an enlarged perspective view, partially in section, showing the trunnion and clamping arrangement;

Fig. 5 is a further sectional view looking in the direction indicated by the line V—V in Fig. 4, and illustrating in detail the trunnion extension;

Fig. 6 is a perspective view of the cradle for supporting the motor and blade assembly; and Fig. 7 is a detail perspective view of the clamping lever, illustrating its forked end.

Referring to the general assembly view of the fan shown in Figs. 1 and 2, the numeral 10 designates a motor cradle, supporting a motor 11 and fan blade assembly 12. The motor 11 is secured to upper and lower tie plates 13 of the cradle 10 as by machine screws 14 extending through openings 14a in the tie plates. A shroud 15, comprising upper and lower members which provide the upper and lower halves of shroud rings 16 and which have mating flanges 40, is fastened to motor cradle 10 by means hereafter described. Back cover 17 and air directing vanes 18 in the front in conjunction with guard members 16 completely enclose said motor 11 and fan blade assembly 12 to provide protection therefrom.

The motor cradle 10 is pivotally supported for angular adjustment by a generally rectangular base assembly 19. The base assembly 19 comprises a pair of U-shaped base rods 20 which have their upright extensions or parallel legs 21 secured, in convergent relationship, to trunnion bearing members 22. The U-shaped base rods 20 may have their bight portions 23 curved slightly above the horizontal, and the four points on which the legs rest are in the same plane while the bearing members 22 are parallel and on the same center line. Each bearing member 22 is preferably a sheet metal stamping comprising a top portion 24 and a support portion 25 having divergent edges 26. Each bearing member 22 is provided with an inwardly turned peripheral wall or flange 27 around the upper and side edges of its top portion 24 and along its divergent edges 26. As seen in Fig. 4, the inwardly turned wall 27 serves to constrain the upright extensions of parallel legs 21 in convergent relationship, the legs 21 being secured to bearing members 22 such as by welding or other means.

Referring to Fig. 6, the motor cradle 10 is shown in greater detail. It comprises the pair of elongated tie plates 13 arranged in superimposed relationship with their center portions spaced apart to receive the fan motor 11. A pair of trunnion members 30 are secured, one at each end of cradle 10, between the diametrically disposed ends of the tie plates 13. As shown in Figs. 3 and 4, each trunnion member 30 comprises a pair of plates 31 and a bearing cap 36. Each trunnion plate 31 is formed with an elongated base 33, a neck portion 34 and a semi-circular disc portion 35 which is bent at right angles to said neck portion 34. The diameter of said semi-circular disc portion 35 is greater than the width of said neck portion 34. The two trunnion plates 31 are secured together, such as by welding, with their semi-circular disc portions 35 turned upwardly and downwardly respectively, and their neck portions 34 and elongated base portions 33 in coincident relationship. The aforementioned cap 36, having an inturned flange 37, is suitably secured to the outer surfaces of the semi-circular disc portions 35 and cooperates therewith to form a rigid disc-like end member or end portion 38 for the trunnion member 30. It will be noticed that trunnion plates 31 are secured to the tie plates 13 along inner edges of their elongated base portions 33 and have a plurality of holes 39 in a row disposed lengthwise of said base portions 33 as shown in Fig. 3, the channeled flanges 40 of the shroud members are fastened to trunnion plates 31 by means of screws 41 which extend through the openings 39 and nut 42 thereon.

The assembly of the base 19 to the motor cradle 10 (with motor 11, fan blade assembly 12 and shroud 15 installed on said cradle 10) is accomplished by springing the two pairs of upright extensions 21 of base 19 apart and inserting the ends of the two trunnion members 30 into the trunnion bearing members 22 at the sides of said base. As seen in Figs. 1, 3 and 4, this spreading action is necessary to permit trunnion members 30 to clear the inturned flanges 27 of bearing members 22. The trunnion end members 38 nest within bearing members 22, as shown in Fig. 3, with the outer surface of the caps 36 in engagement with the inner surface of their respective bearing members 22. Each trunnion end member 38 rests on a spacer 47 surrounding a bolt 43 that projects from the inner surface of each bearing member 22.

The trunnion end members 38 are frictionally clamped within their respective bearing members to maintain the fan in any selected angular position. In accordance with this invention, the clamping means includes a clamping lever 44 supported on the inner side of each bearing member 22 by the bolts 43 which project through openings 45 in the clamping levers. Each clamping lever 44 is retained on its bolt 43 by the nut 46 which is tightened against the spacer 47. The opening 45 in each clamping lever 44 is somewhat larger than the outside diameter of spacer 47 to permit the lever to rock freely on bolt 43.

As best shown in Fig. 7, the upper end of each clamping lever 44 is forked, with the tongues 48 thereof straddling the neck portion 34 of trunnion member 30. The lower end of each clamping lever 44 extends along the inner surface of its respective bearing member and is provided with a tapped opening 49 adapted to receive a threaded thumb screw 50. The end of screw 50 bears against a recessed portion 51 of bearing member 22.

It will readily be seen that tightening of a thumb screw 50 forces the lower end of its respective clamping lever 44 away from the lower portion 25 of bearing member 22. Bolt 43, nut 46 and sleeve 47 cooperate to form a fulcrum member about which lever 44 pivots as the tongues 48 of its upper forked end are forced against the inner surface of the disc-shaped end member 38 of trunnion member 30, forcing the outer surface of trunnion cap 36 against the inner surface of bearing member 22. The disc-shaped end member 38 of trunnion members 30 is thereby frictionally clamped between the forked end of the clamping lever 44 and bearing 22. The clamping force applied to each trunnion 30 may be varied by adjusting the thumb screw 50, thus permitting sufficient frictional force to be applied to prevent the fan from tilting accidentally, while leaving the fan free enough to be easily tilted by hand, when desired, without loosening the clamping means. The clamping levers 44 are preferably made of spring-like metal to permit them to deflect slightly when the thumb screws are adjusted and thereby apply a spring clamping force to the trunnion end member 38.

It should be pointed out that the friction type pivotal connection described above employs a novel clamping system entirely independent of any movement of the trunnion members themselves. Thus, movement of the fan about its trunnion axis does not tend to tighten or loosen the frictional clamping means.

From the foregoing description, other advantages and features of this invention will be apparent to those skilled in the art. For example, it will be noted that the lower ends of clamping levers 44 and their associated thumb screws 50 are substantially hidden by the bearing skirt portions 25, giving the fan structure a smooth, neat exterior appearance. The pivotal support of this invention may also be manufactured economically since only a few elements are required in its construction and the majority of these may be made by stamping them from sheet metal.

While I have shown my invention in but one form, it will be obvious to those skilled in the art that it is not so limited, but is susceptible of various changes and modifications without departing from the spirit thereof.

What is claimed is:
1. A pivotal connection comprising a trunnion member comprising a pair of plates secured together in coincident relationship, each of said plates having a neck portion and a semicircular end portion of greater width than said neck portion, said plate end portions being bent at right angles to said neck portions, said trunnion member including a disc-like end member formed at least in part by said plate end portions, a bearing member adapted to receive said trunnion member, said bearing member having a portion thereof in engagement with the unobstructed face of said trunnion end member, a clamping lever pivotally attached to said bearing member, said lever having a forked end straddling the neck portions of said trunnion plates, and means for biasing the forked end of said lever against the other face of said trunnion end member to clamp said end member between said lever and said bearing member.

2. A pivotal support for motor-driven fans or the like comprising the combination of a cradle, a pair of trunnion members extending from opposite ends thereof, each of said trunnion members including a disc-like end member at the end thereof arranged substantially at right angles to the axis of the trunnion, a base assembly adapted to rest on a flat horizontal surface and including spaced upright portions, sheet metal support members, the upper portions of which constitute bearing members, the inner surfaces of said bearing members engaging the unobstructed faces of said end members, each support member having a peripheral wall extending along the upper half of the periphery of the bearing member and downwardly therefrom along the opposite sides of the support member, said upright portions being attached to the inner surfaces of the lower portions of said support members between portions of said peripheral wall, a clamping lever disposed adjacent the inner surface of each of said support members, means pivotally attaching a central portion of each lever to the support member below the disc, said lever having the upper end thereof forked with the tongues thereof straddling said trunnion and engaging the other face of the disc, and adjusting means for moving the lower end of the lever away from the support member to clamp the end member between its bearing member and the said one end of the lever, the arm of said clamping lever from the pivotal attachment to said lower end being substantially greater than the lever arm extending from the pivotal attachment to the said one end.

References Cited in the file of this patent

UNITED STATES PATENTS

| | | |
|---|---|---|
| 2,123,448 | Weber | July 12, 1938 |
| 2,128,046 | Heil | Aug. 23, 1938 |
| 2,606,273 | Franklin | Aug. 5, 1952 |
| 2,690,296 | Rodwick | Sept. 28, 1954 |

FOREIGN PATENTS

| | | |
|---|---|---|
| 526,046 | Great Britain | Sept. 10, 1940 |